May 8, 1928.
E. P. CRESSLER
INTERCHANGEABLE TEETH
Filed Aug. 20, 1926
1,669,287
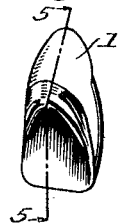
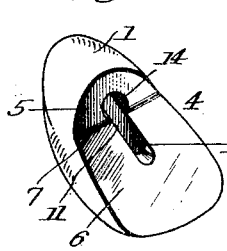
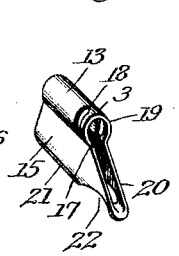
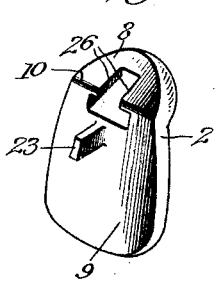
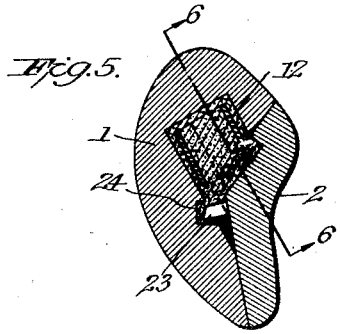
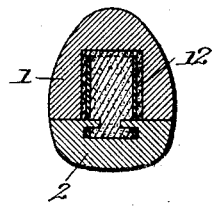
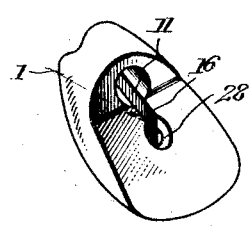
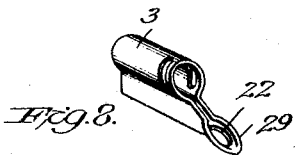
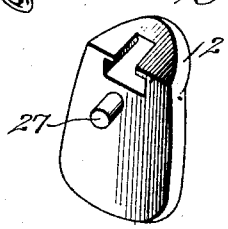
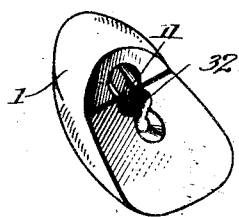
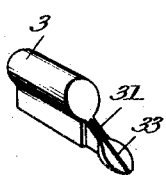
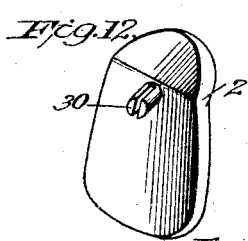
Inventor
E. P. Cressler
By Rogers Kennedy Campbell
his Attorneys Patented May 8, 1928.

1,669,287

UNITED STATES PATENT OFFICE.

EDWARD P. CRESSLER, OF NEWTON, KANSAS.

INTERCHANGEABLE TEETH.

Application filed August 20, 1926. Serial No. 130,509.

This invention relates to artificial teeth and has reference more particularly to a form and construction of the parts adapted to secure a firm connection of the tooth facing (either anterior or posterior) with the backing or retaining members so that in case of breakage of a facing a new facing may be readily substituted therefor on the original backing, that is, the tooth facings may be interchangeably mounted on the backings.

This invention has certain features in common with the inventions disclosed in my Patent 1,507,231, issued September 2, 1924, and my applications Serial No. 637,948, filed May 10, 1923, and Serial No. 10,198, filed February 19, 1925, and constitutes an improvement over the constructions disclosed therein.

The object of the invention is to produce a form of connection between the tooth facing and backing plate or member, which will be of extreme effectiveness in holding the parts in firm and secure engagement with each other without danger of loosening or displacement, and yet will admit of a new facing being readily substituted for a broken facing.

Another object of the invention is the provision of a tooth facing having an angled recess in its rear face, a pin-receiving slot of key-hole shape extending from the recess at the apex thereof and a post-receiving hole extending from the slot.

A further object of the invention is the provision of an interchangeable tooth facing having a root or saddle extension, a backing plate and an assembling pin so formed and arranged that the facing may be guided into interlocking engagement with the backing by the pin.

A still further object of my invention is to provide porcelain tooth-facings, either anterior or posterior, of various shapes and sizes, so that the members for each particular size will be interchangeable and be adapted to be interlocked with a retaining member.

With these and other objects in view, as will appear as the description proceeds, the invention consists of the novel features of construction, combination of elements and arrangement of parts hereinafter to be fully described and pointed out in the claims.

A full and complete understanding of the invention may be obtained from a consideration of the following detailed description, taken in connection with the accompanying drawings forming a part of the disclosure, it being understood that while the drawings show certain practical embodiments of the invention, the latter is not confined to the showing thereof, but may be changed and modified so long as such changes and modifications mark no material departure from the salient features of the invention as hereinafter fully described and claimed.

In these drawings:

Figure 1 is a perspective view illustrating a tooth facing and backing plate operatively assembled in accordance with one embodiment of my invention;

Figures 2, 3 and 4 are views in perspective, somewhat enlarged, of the facing, the guiding pin and the backing plate, respectively, employed in the embodiment shown in Figure 1;

Figure 5 is a sectional view somewhat enlarged and taken on the line 5—5 of Figure 1;

Figure 6 is a sectional view taken on line 6—6 of Figure 5;

Figures 7, 8 and 9 are views in perspective of the facing, pin and backing plate, respectively, of another embodiment of my invention, and Figures 10, 11 and 12 are views in perspective of the facing pin and backing plate, respectively as employed in still another form of my invention.

Referring to Figures 1 to 6 inclusive the reference numeral 1 designates a tooth facing or body of porcelain or some suitable substitute for porcelain, 2 designates a backing member of metal, preferably gold, adapted to seat against the rear face of the tooth facing and be secured thereto, and 3 designates a connecting and guiding pin or post employed in conjunction with the facing and backing member to guide the latter elements toward each other and to interlock them securely when the cement, usually employed in joining tooth facings to their backings, has hardened.

Preferably and as shown, the facing 1 is provided in its rear face with a recess 4 defined by walls 5 and 6 meeting in a line at and diverging from the deepest portion or, as it will be hereinafter termed, the apex 7 of the recess and the backing member 2 is shaped to fit within the recess with its faces 8 and 9 abutting the walls 5 and 6 respectively of the facing and the edge or corner 10 disposed at the apex 7 of the recess. The facing 1 is further provided with a slot 11 of key-hole shape which extends into the body of the facing from the recess 4, adjacent the apex 7 thereof, and is large enough to accommodate the pin 3, to be more fully described hereinafter, and the small amount of cement 12 necessary to secure it in position.

The pin 3, as shown in Figure 3, is formed of sheet material and is shaped to provide a cylindrical portion 13, to fit within the cythe juncture of the cylindrical and flattened portion 15 to fit within the narrow portion 16 of the slot, the side edges of the sheet of material in this instance abutting at 17 at the juncture of the cylindrical and flattened portions. The cylindrical portion 13 is longer than the depth of the slot 11 and is provided with a pair of diametrically opposed transverse slots 18, the inner sides of which lie in the plane of the wall 5 or parallel thereto when the pin is in its operative position in the facing, for a purpose hereinafter described. The ends 19 and 20 of the cylindrical and flattened portions 13 and 15 respectively of the pin bear the same angular relation to each other as do the walls 5 and 6 of the facing and the side wall 21 of this flattened portion remote from the cylindrical portion is parallel to and longer than the latter. The side wall 21 is apertured at 22 to permit passage therethrough of an anchoring post 23 fast on and extending from the face 9 of the backing 2. The post 23 passes through aperture 22 and projects into a post receiving hole 24 extending from the narrow portion 16 of the key-hole slot 11.

The backing plate 2 is slotted as at 25 to provide a pair of spaced shoulders 26 for engagement in slots 18 to guide the movement of the associated pin and facing into assembled relation with the backing.

The embodiment of the invention shown in Figures 7 to 9 inclusive, differs from that just described in that a round anchoring post 27 is employed instead of the rectangular comparatively thin post 23 as shown in Figure 4. To use a round and consequently stronger post it is necessary to widen the portion of the pin through which the post is to pass. As shown, this result is obtained by reaming out the porcelain adjacent the end of slot 11 or initially molding the porcelain to provide a widened recess 28 and the material of the pin is spread out as at 29 to fill the recess 28.

Instead of slotting the backing plate to provide shoulders to guide the assembling movement of the facing and backing on the pin as above described, a slotted post 30 may be provided on the backing to engage a narrowed portion 31 on the pin 3 for the same purpose, the post 30 extending beyond the slotted portion 31 to lock the elements in assembled relation. An aperture 32 which extends beyond the wall of slot 11 is provided for the reception of the pin 30. While the pin is shown in Figure 11 as solid and is slit as at 33, to permit widening of a portion thereof to temporarily maintain the pin in the facing during construction, it is to be understood that a sheet metal pin having a pressed-in recess 31 may be employed.

On account of the limitations of porcelain, it is impossible to grind surfaces and drill diverging holes accurately and it is therefore difficult to form a root or saddle tip tooth facing which will interlock accurately with a backing. By the present invention a pin is used which can readily be formed accurately to engage the backing and can itself be readily altered or changed to make up for the deficiencies in the porcelain.

I claim:

1. An artificial tooth structure including a tooth-facing provided with a recess and a slot therein, a backing provided with projections at least one of which projections seats in the slot, and a pin adapted to engage the walls of the slot and with the projections; whereby the tooth facing and backing are interlocked.

2. A tooth-structure including a facing provided with an approximately key-hole shaped recess, a retaining-member provided with projections extending into the recess, a pin member disposed in said recess and interlockingly engaging with the walls of the recess and with the projections.

3. A tooth-structure including a facing provided with an approximately key-hole shaped recess having undercut walls, a retaining-member provided with projections extending into the recess and a retaining-pin disposed in said recess and together with the projections on the retaining-member engaging the undercut walls.

4. A tooth-structure including a porcelain tooth-facing provided with a recess having a plurality of backing-seating faces and a slot extending from the recess, a metallic backing carrying a projection and a groove, a pin having a hole therethrough and slots therein, said pin disposed in the slot of the recess to engage the projection and groove of the backing; whereby the tooth facing and backing are interlocked.

5. A tooth-structure including a tooth-facing provided with an elongated groove and a hole opening thereinto, a retaining member having a projection adapted to seat in the hole, and a pin member engageable with the retaining member and fitting within said groove to effect an interlocking of the retaining member with the tooth facing.

6. A tooth-structure including a tooth-facing provided with an elongated slot and a hole opening thereinto, a pin member fitting within the groove and having an opening therein in alinement with the hole in the facing, a backing plate fitting against the facing and having a post extending into the hole through the pin member, and cooperating means on the pin and backing for interlocking the facing and backing.

7. An interchangeable tooth-structure comprising a tooth facing having a recess in its rear face and formed with an elongated slot opening into the recess and a hole opening into the slot, a separate pin member disposed partially within the slot and having an opening therethrough in line with the hole, a backing plate formed to fit within the recess, and cooperating means on the backing plate and pin whereby the facing may be guided into interlocking engagement with the backing by said pin.

8. An interchangeable tooth-structure comprising a tooth facing having a recess in its rear face and formed with an elongated slot opening into the recess and a hole opening into the slot, a separate pin member disposed partially within the slot and having an opening therethrough in line with the hole, a backing plate formed to fit within the recess, a post fast to the backing plate and adapted to extend into the hole through the aperture in the pin, and cooperating means on the backing plate and pin whereby the facing may be guided into interlocking engagement with the backing by said pin.

9. A pin for interlocking an artificial tooth to a backing plate including a cylindrical portion and an integral flattened portion, the cylindrical portion being formed to provide means for interlocking the pin with a backing plate and the flattened portion being apertured to permit engagement therein of a locking pin.

10. A pin for interlocking an artificial tooth to a backing plate including a cylindrical portion and a flattened portion, each of said portions being formed with locking means for interlocking engagement with a backing plate.

11. In an artificial tooth, a facing provided with a root-extension and a crown portion and formed with a recess in its rear face and with a slot opening into the recess, a separate pin shaped to fit the slot in the facing and having an aperture therethrough, and a backing plate having a projection thereon adapted to seat in the recess and to engage and interlock with the facing through the pin.

12. In combination with a tooth facing having an angled recess in its rear face, a key-hole slot extending into the body of the facing from the recess and a hole extending from the slot, a separate pin fitting the slot and having an opening therethrough in alinement with said hole, a backing plate formed to fit within the recess, cooperating interlocking means on the pin and backing plate, and means on the backing plate traversing the pin and fitting within said hole to interlock the facing and backing plate in assembled relation.

In testimony whereof I affix my signature.

EDWARD P. CRESSLER.